July 19, 1960     R. W. BERRY, JR     2,945,288

MILLING CUTTER

Filed June 16, 1958     2 Sheets-Sheet 1

INVENTOR
ROBERT W. BERRY, JR.
BY
Barnes, Kisselle, Raisch & Choate
ATTORNEYS

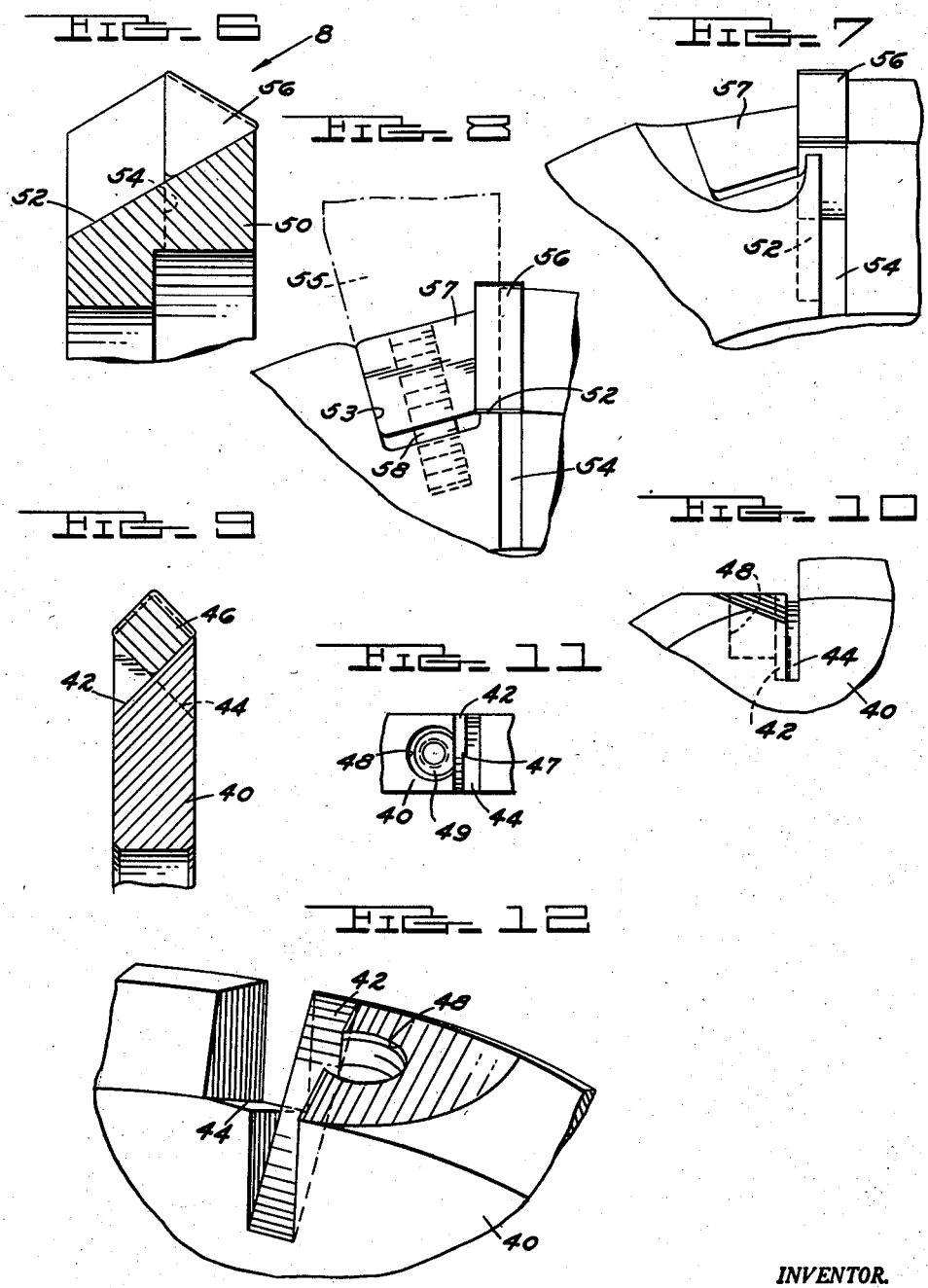

United States Patent Office 2,945,288
Patented July 19, 1960

2,945,288

MILLING CUTTER

Robert W. Berry, Jr., Ferndale, Mich., assignor to Wesson Company, Ferndale, Mich., a corporation of Michigan Filed June 16, 1958, Ser. No. 742,171

8 Claims. (Cl. 29—105)

This invention relates to a tool such as a milling cutter and particularly to that type of cutter which is known as a throwaway cutter. In recent years the so-called throwaway milling cutter has come into use utilizing pellet type carbide inserts which are mounted at suitable angles in the cutter body to permit milling operations. The pellets are indexable on both sides so that a four-sided pellet, for example, can have eight cutting edges when mounted in a milling cutter body at a negative rake angle. An example of this type of milling cutter is found in the Begle Patent 2,690,610.

Numerous attempts have been made to find a suitable way of accurately locating these pellets in the milling cutter body at the rim thereof. It is essential that the pellets be retained accurately in the milling cutter so that upon indexing, the cutting edges will always lie in the same plane. Demountable rings have been used for supporting the pellets both axially and radially, and insertable pins lying axially or radially have been used to locate the pellets on one dimension.

It is an object of the present invention to provide an extremely simple way of locating these pellets which requires no separable parts on the locating body and yet provides a positive backing in each direction required for the carbide inserts.

Figure 1:
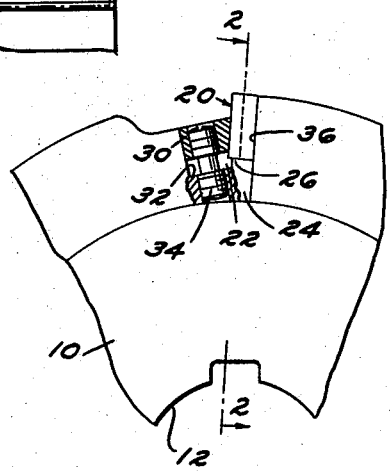

Drawings accompany the description of this invention and the various views thereof will be briefly described as:

Figure 1, a side view of a milling cutter showing a pellet in place.

Figure 2:
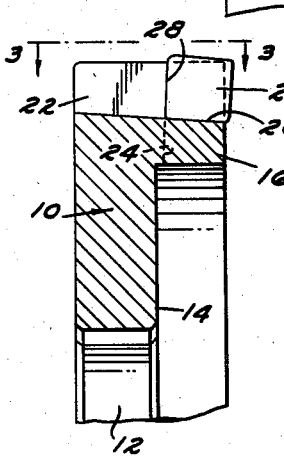

Figure 2, a view on line 2—2 of Figure 1.

Figure 3:
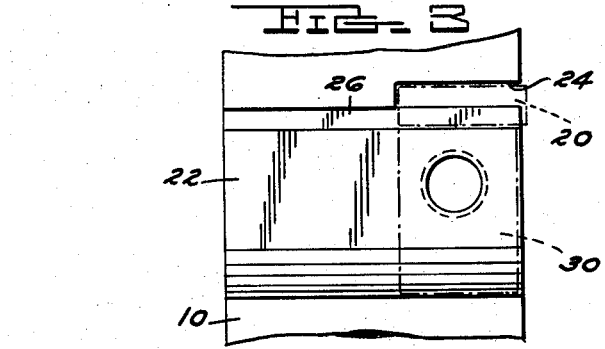

Figure 3, a view on line 3—3 of Figure 2, showing the cavities of the cutter prior to the insertion of the blade or the wedge.

Figure 4:
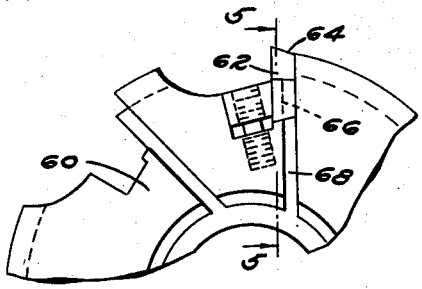

Figure 4, a boring cutter showing the use of a five-sided pellet with a positive rake angle.

Figure 5:
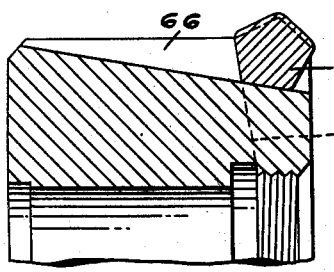

Figure 5, a sectional view on line 5—5 of Figure 4.

Figure 6, a radial section of a triangular insert cutter.

Figure 7, a side view of the cutter of Figure 6.

Figure 8, a view on line 8—8 of Figure 6.

Figure 9, a radial view of a four-sided pellet in a double side milling cutter.

Figure 10, a side view of the embodiment of Figure 9 showing the recesses only.

Figure 11, a view directly into the recesses of the embodiment of Figure 10.

Figure 12, a perspective view of the embodiment of Figures 9 and 10 showing the relationship of the supporting side walls.

Referring to the drawings, in Figures 1 to 3, a milling cutter body 10 has a suitable central opening 12 for a drive spindle and a frontal recess 14 leaving a rim portion 16. The recess or pocket for the insert 20 is created by two recesses which pass through the rim of the milling cutter in directions which are substantially 90° to each other. One passage 22 passes axially of the rim of the milling cutter and has a circumferential dimension which is less than, and preferably approximately ½ of, the carbide insert to be held. If a wedge is to be the fastening device the second slot can be wide enough at the wedge location to include the wedge space required. The other passage 24 passes radially of the cutter through the rim 16 spaced circumferentially from passage 22 so that the planes of the two passages intersect, the second passage 24 also having a dimension less than and preferably approximately equal to ½ of the thickness of the pellet 22 resulting in a pocket at the intersecting area of the two passages 22 and 24 which is approximately equal to the thickness of the insert 20. The insert thus has a recess suitably dimensioned to receive it and is supported radially by a positive seat 26 as one edge of passage 22 and supported axially by a positive seat 28 as one edge of the passage 24. While the slots illustrated are about equal in width, the transverse dimension of the insert may be divided in varying degrees between them as long as a suitable ledge is provided in each for insert support.

A suitable holding means is used with the insert which can be a rectangular, flat-sided wedge clamp 30 held in a recess 32 by a differential screw 34, the wedge serving to urge the carbide insert against the wall 36 of the milling cutter, which wall is one side of the passage 24. Thus with an extremely simple physical construction the pellet is suitably locked in place axially, radially and circumferentially. In Figure 3, the slots 22 and 24 are shown, the slot 22 being wide enough to accommodate also the wedge 30, the supporting ledge for the bottom of the insert being at 26 and wedge opening being at 32.

In Figures 9 to 12, I have shown a modification of a milling cutter body 40 having passages 42 and 44 at right angles to each other but at about a 45° angle to the axes of the cutter. This positions the carbide insert 46 centrally of the cutter as shown. With this design, either side may be used as a cutting side. Thus there is combined a right and left-hand cutter. The recess 48 receives a wedge locking device 49 such as shown in Bader Patent No. 2,778,092. The grooves 42 and 44 can each be a little wider than half the thickness of the insert 46 to create a small step 47 as seen in Figure 11.

In Figures 6, 7 and 8 a milling cutter body 50 has cross passages 52 and 54 disposed at an angle of 60° to each other to receive a triangular carbide insert 56. It will be seen that various positionings and angles can be worked with in numerous milling cutter bodies utilizing the same principle of intersecting passages having circumferential dimensions less than that of the carbide insert, but totaling that of the carbide insert. Here again, as illustrated in Figure 8, the wedge recess 53 can be formed with the passage 52, in a single pass of a cutter 55, to receive wedge 57 controlled by screw 58.

In Figures 4 and 5, a boring cutter body 60 is used to hold an insert 62 having angled edges 64 which make it a positive rake cutter as disposed in the cutter body. The passages for locating the carbide inserts include passage 66 extending substantially axially of the cutter, and passage 68 extending substantially radially of the cutter intersecting at the corner of the cutter and disposed at an angle of about 72° to receive the pentagonal sides of the insert 62.

It will be seen that with the present construction, one of the cross-slots may be wide enough to include the locking device as shown in Figures 1, 4 and 8. Also the fastening device may be of cylindrical construction as shown in Bader Patent No. 2,778,092 or in Skeel Patent No. 2,547,789.

The construction is especially adapted for accurate finishing where such is desired since the slots may be easily finish-ground after heat treating to remove any distortion resulting from the heat treat. The construction may be used on milling cutters, facing or boring cutters, side mills, and other tool bodies where indexable-throwaway inserts can be used.

I claim:

1. In combination, a prismatic insert of cutting material having cutting edges at various corners thereof, a tool body supporting said insert comprising, a body portion, passages formed in said body spaced laterally from each other and extending in directions angled to each other but intersecting adjacent a surface of said body, the area of intersection forming a receiving pocket for said prismatic insert, the side walls of said passages away from the surface serving as locating surfaces for insert, and means in said body adjacent said passages for exerting pressure between said body and said insert to lock said insert in said pocket.

2. A device as defined in claim 1 in which the opposed walls of said passages are parallel but in spaced planes, and the adjacent walls of said passages lie in substantially the same plane.

3. A cutting tool comprising prismatic inserts of cutting material, a circular body having a face recess on one side thereof centrally of the body to provide an axially extending flange at the rim thereof and a plurality of pairs of axial and radial slots in said body intersecting at one corner thereof, said axial passages opening at the circumference of the body and said radial passages opening in the inner and outer circumference of the flange of the body as well as at the recessed face of the body, said passages being located in spaced planes but intersecting on a common plane to provide recesses in the circumference of said body having radial and axial locating surfaces for cooperating with adjoining surfaces of a prismatic insert, and a plurality of prismatic inserts in said body, one in each recess, having adjoining surfaces lying in contact with the radial and axial locating surfaces of said passages.

4. A cutting tool comprising a plurality of prismatic inserts, a circular body having substantially parallel faces extending radially of the body and a plurality of recesses formed in the circumference of the body, each recess being formed by crossed passages extending through the body from one face to another in spaced planes which intersect at a common plane, the recesses extending in a direction at an angle to each other and to the axis of the circular body, and a prismatic insert in each recess having angled adjoining surfaces lying in contact with angled walls of respective crossed passages at each recess.

5. In combination a prismatic insert of cutting material having parallel surfaces defined by geometric areas of identical shapes and connected at the edges by surfaces forming the side walls of the prism, and a tool body for supporting said inserts comprising, a body portion having passages formed in said body at angles to each other and terminating at an outer surface of said body, said passages having inner walls angled to the same degree as the adjacent sides of the geometric areas of said prism, said passages lying between spaced planes and having a common plane, said prism being supported in said body on the inner walls of said passages which are disposed at angles complemental to the side walls of the prismatic insert.

6. A cutting tool comprising one or more prismatic inserts of cutting material, a body portion, passages formed in said body intersecting at one surface thereof, and spaced laterally from each other wherein the area of intersection is wider than either passage to form a receiving pocket having angled supporting surfaces at said area for an insert, a prismatic insert in each said pocket having angled side edges supported respectively on said angled supporting surfaces, and locking means on said body adjacent said receiving pockets to exert a locking pressure on said inserts.

7. A tool for supporting one or more prismatic inserts of cutting material which comprises, a body portion, passages formed in said body lying between parallel planes but spaced laterally and extending in directions angled to each other and intersecting adjacent a surface of said body, the area of intersection forming a receiving pocket for an insert, the side walls of said passages away from the surface at the area of intersection serving as locating surfaces, a prismatic insert in each said pocket having angled side edges supported respectively on said angled locating surfaces, and locking means on said body adjacent said receiving pockets to exert a locking pressure on said inserts.

8. A tool as defined in claim 7 in which the lateral dimension of said passages is substantially equal and that of each approximates one-half the lateral dimension of the insert to be held.

References Cited in the file of this patent

UNITED STATES PATENTS

| | | |
|---|---|---|
| 2,149,230 | Reaney | Feb. 28, 1939 |
| 2,455,230 | Catlin | Nov. 30, 1948 |
| 2,684,520 | Severson | July 27, 1954 |
| 2,848,788 | Goglanian | Aug. 26, 1958 |